Jan. 27, 1925.
H. W. FISHER ET AL
1,524,124
CONSTRUCTION OF CABLES
Filed July 2, 1920
2 Sheets-Sheet 1
FIG. I.
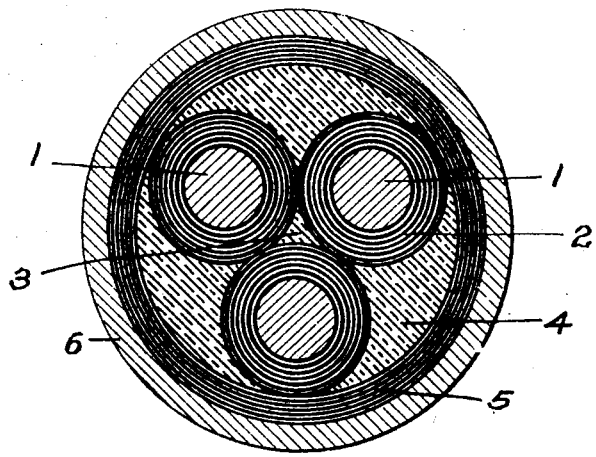
FIG. II.
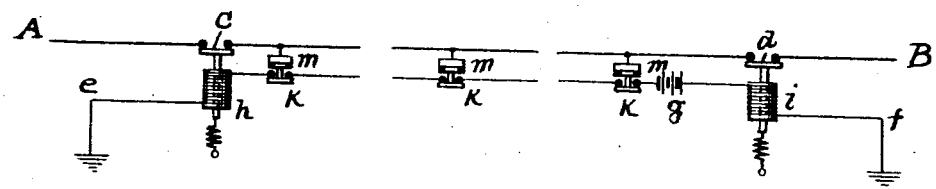
FIG. III.
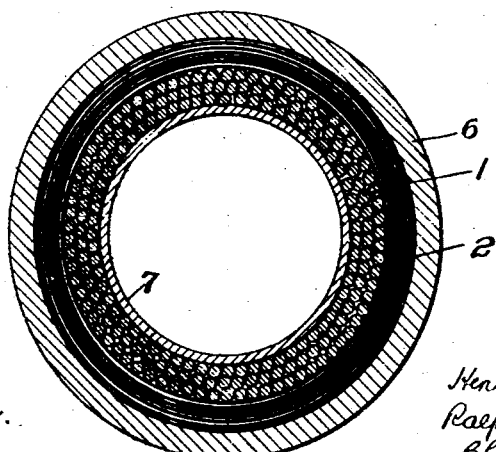
WITNESSES
J. Helch Bradley
J. Harris J. Tomasson
INVENTORS
Henry W. Fisher and
Ralph W. Atkinson, by
Chrity and Chrity,
their attorneys

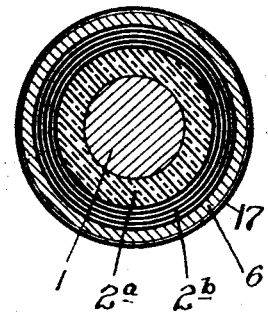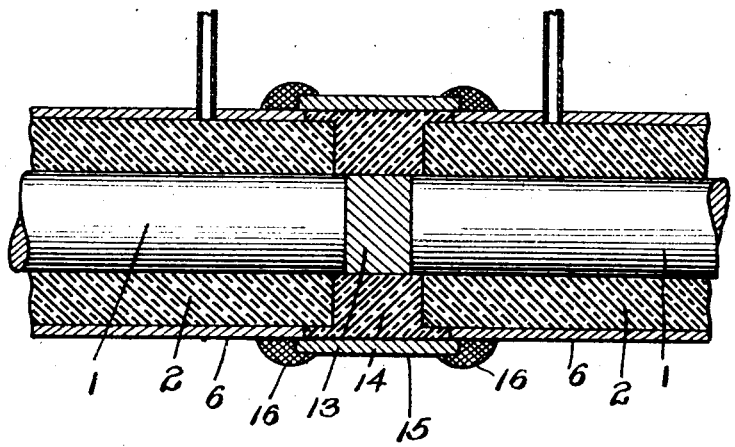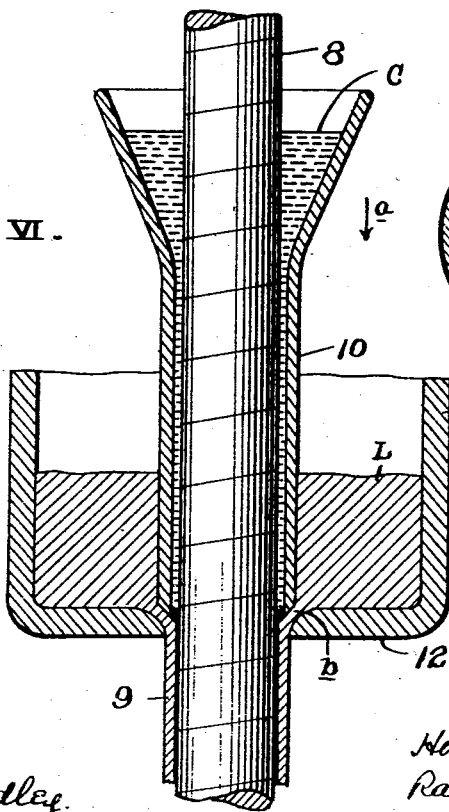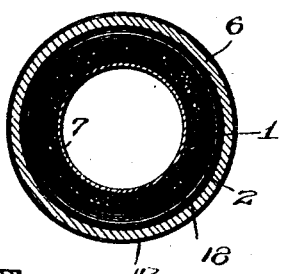

Patented Jan. 27, 1925.

1,524,124

UNITED STATES PATENT OFFICE.

HENRY W. FISHER AND RALPH W. ATKINSON, OF PERTH AMBOY, NEW JERSEY, ASSIGNORS TO STANDARD UNDERGROUND CABLE COMPANY, OF PITTSBURGH, PENNSYLVANIA, A CORPORATION OF PENNSYLVANIA.

CONSTRUCTION OF CABLES.

Application filed July 2, 1920. Serial No. 393,574.

*To all who it may concern:*

Be it known that we, HENRY W. FISHER and RALPH W. ATKINSON, residing at Perth Amboy, in the county of Middlesex and State of New Jersey, both citizens of the United States, have invented or discovered certain new and useful Improvements in the Construction of Cables, of which improvements the following is a specification.

Our invention relates to improvements in the construction of cables used for the transmission of electric power, such cables as are commonly spoken of as high-voltage cables; they are adapted to carry currents under a pressure of 10,000 volts and upward. The object of our invention is to produce an insulating envelope which shall excel insulation heretofore used for this purpose, both in the matter of dielectric strength and that of leakage prevention.

Electric cables of the class with which we have to do consist essentially of conductor, insulation, and sheath. There may be a single conductor within a cable, made up of a single strand or of many strands, or there may be a plurality of conductors. Ordinarily there are three. These conductors are enveloped in insulation; this insulation may be massive (India rubber, for example), applied in plastic condition; again, this insulation may consist fundamentally of a succession of solid bodies such as rings of porcelain strung upon the conductors; but most commonly the insulation for high voltage cables is fundamentally composed of a body of fibrous material. This fibrous material is ordinarily paper or cloth in strip form wrapped spirally and in superposed layers upon each conductor individually; and, if there be a plurality of conductors within a single sheath, the individually wrapped conductors are assembled symmetrically about an axis, the spaces filled and the whole grouping built out to cylindrical form by coarser space-filling insulating substance (jute ordinarily or paper), and the whole cylindrical body is then ordinarily wrapped about with another spiral wrapping, called the belt insulation, similar to that which encircles the individual conductors. A sheath of lead encases and encloses the whole. Sometimes the fibrous strip or tape of paper or cloth is applied in its dry or natural condition; sometimes when applied it has already been filled and coated with an insulating varnish; sometimes it may, before or at the time of wrapping, be filled or saturated with a substance called insulating compound, a substance ordinarily of oily or resinous nature, effective to increase the dielectric strength of the insulation. The tape envelope may be wrapped on in dry state, and after wrapping on may be filled or coated with such an insulating compound; or, again, after the cable has been otherwise so far completed as to be ready for the lead covering—or, sometimes, at an earlier stage in the assembly, the entire cable may be impregnated with such an insulating compound, by any of the several methods known to the art.

In the accompanying drawings, Fig. I shows in cross section a cable of suitable character, to have our invention applied to it; Fig. II is a diagrammatic view, and to very much smaller scale, of a cable installation, having associated with it auxiliary apparatus operative, by virtue of the presence of our invention, to effect certain desirable ends; Fig. III is a view similar to Fig. I, illustrating a modification in structure; Fig. IV is a view similar to Fig. I, illustrating certain refinements in the application of our invention; Fig. V is a view in longitudinal and medial section of a junction of cable lengths, illustrating another refinement; Fig. VI is a view in medial section through the lead press in which the lead sheath of a cable is formed, and illustrating diagrammatically a detail which may be included in the practice of our invention; Fig. VII is a view in cross section and in this respect similar to Figs. I, III, and IV, of a cable in which are united features severally shown in other figures.

Referring, first, to Fig. I, a typical three-conductor cable will be found illustrated. The individual conductors are indicated at 1; these are here shown to be solid conductors, but the showing is in this respect rather diagrammatic, and it will be understood that these conductors may be, and ordinarily they will be, stranded conductors, composed each of a bundle of relatively fine wires. However, in some cases, solid conductors will be used. About each conductor lies a wrapped-on envelope 2 of insulation. 3 is the central filler, ordinarily of jute; and 4 are the laterals, of the same material. The whole is wrapped about with the belt insulation 5, and 6 is the lead sheath.

As has been explained, the bodies of insulation 2 and 5 are, ordinarily, built up of paper (or cloth) tape, wrapped on spirally and in superposed layers. This wrapped-on material (we are speaking in generalizations, to include common variations in cable-making) may be cambric, varnished and dried before application; it may be cloth or paper, previously saturated with insulating compound; or it may be dry or unfilled paper or cloth. Sometimes, though not necessarily, the wrapped-on material (particularly if previously saturated) is, at the time of wrapping, coated or flooded with insulating compound. The ordinary paper-insulated cable is made by wrapping the individual conductor 1 with the paper insulation 2 while the paper is still in dry or unfilled condition. The separately enveloped conductors are then assembled with the jute filling material 3, 4, and the belt insulation 5 is applied, in like manner as insulation 2. At one or more stages in this process the cable is dried, and its insulation is impregnated by immersion in insulating compound. The jute fillers 3 and 4 may or may not be preliminarily impregnated; but, ordinarily, in the building of paper insulated cables, these fillers are impregnated when (as usually occurs) the otherwise completed cable, ready for the lead sheath, is saturated by immersion in compound.

In practicing our invention, a procedure may be adopted which, otherwise, would not commend itself; the whole body of insulation may be applied and built up, without any insulating compound whatever; the fibrous or porous material may be left quite dry. Indeed, it may in some cases be additionally preferable to omit the fillers 3 and 4.

In the application of massive insulation, such as India rubber, in the filling of fibrous or porous insulation with insulating compound, in filling with liquid or viscid substance the spaces between blocks of solid insulation,—in all these cases it will inevitably be true that, however carefully the work be done, there will remain, not wholly dislodged by, but incorporated within the body of the insulation, bubbles (ordinarily minute) of air or other gas or water vapor. Such entrapped bubbles are points of weakness; their presence augments dilectric losses when the cable is in service, with consequent injurious heating of the cable; and, furthermore, their presence limits the voltage-carrying capacity of the cable; for by these bubbles as stepping stones disruptive electrostatic discharges of electricity make their way from conductor to sheath, unless the operating voltage of the cable be limited to so small a value that this effect cannot take place.

The point to which our explanatory statement now comes is that, in the insulation of all cables, bodies of air are present; ordinarily the bodies of air are unintended, undesired, and to the utmost degree possible (though never completely) eliminated. Our invention proceeds upon the acceptance of the presence of air (or other gas) as inevitable, and so deals with it that it shall be relatively ineffective as a source of weakness. Indeed, it becomes itself in certain cases the effective dielectric. It follows that carefulness in the exclusion of air is not in the same degree necessary; and indeed, as we have just intimated, we may with advantage (such ordinarily will be our preference) apply our invention to the air-filled or dry paper-insulated cable—a cable otherwise inadequate for ordinary high-power work.

Our invention consists fundamentally in puting the air present in the cable insulation (whether the quantity be reduced to the smallest possible unintended remnant, or whether it be the much greater intended quantity present in the dry or air-filled cable) under pressure, under a pressure of substantial amount. By substantial amount we mean a pressure so great that fluctuations due to changes of temperature under operative conditions (a range of 100° F., more or less) shall be relatively insignificant, in comparison with the actual value of the pressure. Practically, we find an absolute pressure of two atmospheres, (that is to say, one atmosphere above atmospheric) and upward adequate to effect the ends we have in view.

If it be a matter of small occluded bubbles of air or other gas, the substance in which the bubbles are held must, of course, at the time when the pressure is applied, be responsive to the pressure. If normally that substance be viscid or solid, it may for the purposes of our invention be rendered temporarily fluid—ordinarily by heat.

Pressure has two effects: in the case of occluded bubbles it reduces their size, and so is the equivalent of more complete elimination; but in all cases, that of the dry or air-filled cable as well, compression of the air or other gas decreases in marked degree dielectric leakage at high voltages and consequent heating, and increases in marked degree dielectric strength. In this breaking down of insulation the phenomenon of ionization of the pocketed air takes place what is termed "internal corona effect" is brought about. The so segregated bodies of air are under the stress of high voltage physically changed, so that they become electrically conductive.

Where a conductor carrying a high-voltage current is separated from another conducting body by an intervening air gap, the air is under a stress which increases as the voltage of the passing current increases. There is a critical point in this rise of voltage beyond which, if the point be exceeded, ionization of air in the gap will take place, and electrical discharge across the gap will follow. The critical point in any such situation is a function of the pressure of the air in the gap. We have discovered, and herein lies our invention, that the principle just stated may be applied with practical gain, in the building of high-tension cables. Hitherto all the effort has been to eradicate to the uttermost small pocketed bubbles of air; the impossibility of complete eradication has been a limiting circumstance, preventing more extended use of insulated cables. We have proceeded along a course widely variant from what hitherto has been universally held to be good and proper practice; we cease to strive to the uttermost for the removal of air bubbles, or for the prevention of their occurrence; we accept their presence as practically inevitable; and we so deal with them as to render them innocuous and no longer sources of danger to the cable when in service. Indeed, we find that, as one application of our method, we can dispense with fluid insulating compound altogether; that we can build a dry cable, and make it effective. By pressure we so far raise the critical point of the contained air that within the intended ranges of voltage the critical point will not be reached, there will be no ionization of the air within the body of insulation, and no consequent breakdown, but the insulation will be good and effective.

In practice we preferably employ a cable whose insulation consists fundamentally of a spiral wrapping of paper; we abandon the use of insulating compound, and have rather a dry, air-filled cable. We take the usual measures, to remove from the paper in fullest possible degree all traces of moisture and to leave in the interstices and pores of the paper only clean, dry air. Upon this filling of air we build up, as we have said, a pressure which, to meet practical conditions of high-tension service, should amount at the least to two atmospheres. The actual pressure which we ordinarily will use will be in value about 100 pounds to the square inch (though a much greater pressure, where it is practically possible to apply and maintain it, will afford still larger beneficial results).

We pause here to note that, in applying our invention to dry, air-filled, fibrous insulating material, alternate compression of the dry air within the otherwise finished cable followed by relief of pressure, and again compression—this alteration being resorted to several times,—will be effective to remove lingering traces of moisture.

In the foregoing paragraphs we have spoken of dry clean air as the filling medium for a dry cable of our invention. It will be understood that another gas might be used instead, and conceivably another gas might prove to be of superior advantage (a gas of distinctive odor, might, for instance, be used; or, again, an inert gas such as nitrogen. An inert gas would have no injurious effect upon the fibrous insulating material.) We mean here only to suggest, not to exhaust the subject. Gases having value on other accounts, even such as have distinctive dielectric properties, may be employed. Ordinarily, of course, gases which are poisonous and gases which are inflammable will be avoided. In the ensuing claims we shall for the sake of simplicity of expression use the terms air and air-filled; but it will be understood that the claims cover and include other gases which may on occasion be used instead.

While we preferably employ an air-filled fibre-insulated cable for the practice of our invention, it still will be borne in mind (as has already been explained) that it is applicable to a cable more or less completely filled with insulating compound, to a cable insulated with massive insulation applied in liquid or plastic form, and to a cable whose insulation consists fundamentally of blocks of solid insulation with filled or unfilled spaces between—it is applicable wherever the body of insulation contains air or other gas, whether in large and intended quantities, or in small, undesired, but irradicable quantities.

If the insulation contains the air or gas in the form of occluded bubbles, and if the insulation be such in nature as to be substantially solid under service conditions, it will be understood that the high pressure applied to the insulation while liquid, in order to bring about the essential condition of our invention, need not be continually maintained, after the insulation has solidified.

For special uses, where the exactions are exceptional, it will be advantageous to build up about the conductor an insulation which, in those parts nearest the conductor, where stress is greatest, is composed of such material as rubber or varnished cambric, and in the outer and remoter parts consists of dry paper filled with air under pressure. The characteristic feature of insulation so built up will be that it consists of superposed layers, the underlying layers relatively massive and the outer layers relatively open and filled with air under pressure. This arrangement will accomplish quite effectively the ends of "grading"—much more effectively, indeed, than can otherwise be accomplished. Furthermore, the pneumatic pressure in the cable will be of additional advantage in increasing the strength of the inner bodies of varnished cloth or rubber in the same way as the dielectric strength of a cable composed entirely of these materials would be increased by the use of the pneumatic pressure. Such a graded cable has higher dielectric strength than a cable consisting wholly of either of the two kinds of insulation under consideration, and in particular cases will be far more useful than either. The structure just described is illustrated in Fig. IV of the drawings which, in view of what has already been said, will be immediately and fully understood: 1 is the conductor, solid or stranded; $2^a$ is relatively massive insulation, such as rubber, or it may be varnished cloth; $2^b$ is relatively porous insulation, such as dry paper; and 6 is the cable sheath. The insulating layer $2^b$ will be understood to be filled with air (or other gas) and the gas to be maintained under pressure, as already described. The condition of bubbles of air in the layer $2^a$ has been sufficiently dwelt upon.

Ordinarily in the practice of our invention in one or another of its several forms, the pressure will be maintained in service by providing an air pump and an accumulator for compressed air (together with means for cleaning and drying the air). Communication will be maintained between the accumulator and the interior of the cable. Suitable check valves will be provided, to prevent accidental escape of air from the cable. Pressure may be distributed throughout the length of the cable by running a pressure supply pipe parallel with the cable (either within the cable sheath or outside) and providing ports of communication at suitable intervals.

If the insulation consist of or be filled with liquid, pressure may be maintained upon it, to compress occluded bubbles, in such manner as we have indicated for an air-filled cable, or the requisite pressure may be maintained by bringing a reservoir of liquid into communication with the liquid insulation under a sufficient hydrostatic head.

Strength may be given to the cable sheath, as is well known, by alloying with the lead of which it is composed a very small amount of tin or other metal or alloy. In common practice antimony, to an amount as great as 1%, or tin, up to about 3%, is used for this purpose. In some cases it will be found necessary or desirable to use a pressure much higher than can be withstood by a sheath of alloyed lead. In such case the sheath may be wrapped with steel or bronze tape. Such a wrapping is indicated at 17, Fig IV. Since even a galvanized steel tape may be eaten gradually away by chemical or electrolytic action, it will in some cases be desirable to apply over such a wrapping of steel tape a second lead sheath. Again, the lead sheath of the cable may be relieved of pressure from within tending to distend it, by placing the lead sheathed cable within an air tight pipe or conduit and maintaining elevated pressure not only within the sheathed cable but also in the space external to the cable and between it and the inner wall of the pipe. Such adaptation of material is of course to be made, wherever the user desires.

In the practice of our invention provision will advantageously be made, to protect the cable from more extensive injury, in case the pressure within the insulation should, in consequence of perforation of the lead sheath (through any cause whatever), fail. To this end, the insulation of a length of cable may be separated off, section from section in this matter of pressure, and for each section a source of pressure may be provided. With such provision, further damage, consequent upon leakage and loss of pressure, will be confined to the section in which the initial fault developed. This is indicated in Fig. V of the drawings. The conductors 1 of adjacent lengths of cable are connected electrically through a body 13 of conducting material, impervious to air. Between the cut away ends of the bodies of insulation 2 of the two section ends, and between the ends of lead sheath 6, a supplementary body of insulation 14 is introduced. This will be massive and impervious, and will engage the surface of the conducting body 13 hermetically. It may, for example, be a body of rubber, shaped while hot. Over the joint will lie an air-tight envelope 15, ordinarily of metal, making close engagement upon the body 14 of insulation and adapted to be secured at opposite ends to the sheath of the two sections in hermetic joint, as by the wiped solder joints 16.

Another protective provision may be resorted to: a cut-out apparatus may be provided, operating to disconnect the cable from its source of electric current, and the cut-out operated by the fall of pressure, in case a fault develops. This is illustrated in Fig. II of the drawings.

In the case of a long section of cable, many thousand feet in length, should the sheath suffer injury at one point, in consequence of which gas escapes very rapidly, the transmission of the impulse of pressure reduction, advancing as may easily be the case with relative slowness, may not reach the protective apparatus of the nature last indicated, to operate it, before very great electrical damage has been done to the cable at points less remote from the initial injury. Therefore it is desirable to provide apparatus, by which the effect of the initial injury may be communicated to the protective apparatus with relatively great rapidity, to the end that the protective apparatus may operate and the length of cable be disconnected, before extended damage of the nature indicated could occur. Accordingly it will in particular cases be desirable to install at short intervals—perhaps at every joint—devices, which, being operated by fall of pressure almost immediately on leakage developing at a nearly adjacent point, shall, through suitable electrical connection and without delay, effect the operation of the protective device and the disconnecting of the entire length of cable involved. Such a device may be made to operate, either by reduction of pressure below a critical point or by a falling of pressure at more than a critical speed.

Throughout such a length of cable as is contemplated in the foregoing paragraph the conductor or conductors will of course be continuous, and there will be no need (so far as the present invention is concerned) to provide cut-out switches at any intermediate point in its length, but only at its end. Such cut-out switch will be operated by the protective apparatus referred to. The insulation, however, which surrounds the continuous conductor may and conceivably will advantageously be divided into sections, each section being pneumatically separate, each separately put under pressure, and each provided with its own pressure-operated device, and every one of these devices being effective to operate the protective apparatus.

The pressure-operated devices will, of course, be distributed at suitable intervals throughout the length of the cable. Any suitable means may be employed for communicating the effect of operation from the remote pressure-operated device to the protective apparatus itself; for example, a wire may be included within the body of the cable (it might be external) through which, on the movement of the relay device, an electrical circuit will be closed (or opened) and, a battery or equivalent source of electric energy being included in the circuit, current will flow (or cease to flow) to operate the protective device, either directly or through a relay.

Referring now to Fig. II of the drawings, A—B indicates a cable of our invention, having the characteristics already noted. $c$ and $d$ are cut-outs arranged at opposite ends of the length of cable A—B. $e$—$f$ is a cut-out operating circuit extending throughout the length of cable A—B, and including a suitable source $g$ of electric energy. $h$ and $i$ are electro-magnets operated by current flowing in circuit $e$—$f$ and effecting the closing and opening of the cut-outs $c$ and $d$, according as they are energized or de-energized. $k$ is a succession of switches arranged in circuit $e$—$f$ at suitable intervals and operated each by a fluid-pressure motor $m$. These motors are subjected to the pressure of the interior of the cable A—B at proper points throughout the length thereof. As shown, current flowing in circuit $e$—$f$ energizes magnets $h$ and $i$ and maintains the cut-outs $c$ and $d$ in closed position. Failure of pressure (consequent on leakage, let us say) at any point will result in the operation of an adjacent motor $m$; the corresponding switch $k$ will open; the circuit $e$—$f$ will be broken; the electro-magnets $h$, $i$ will be de-energized; cut-outs $c$ and $d$ will be opened; and the cable A—B will thus be instantaneously relieved of its load.

The primary advantage of our invention in preferred form (that is, the dry insulation, air filled) lies in the matter of dielectric losses at high temperature. The dielectric losses will be much smaller with the cable of our invention than with the cables hitherto used. Furthermore, according to our invention, in any of its forms, the dielectric strength of the insulation will be considerably greater than that of cable insulation hitherto used. Thus it becomes apparent that it is possible to operate a cable of given dimensions (of given amount of material and requiring a given amount of duct space) at a voltage fifty to one hundred per cent greater than is possible with the cables in use up to this time. The importance of this advantage is far greater at extra high voltage than even at the voltage hitherto commonly used; for, if it were possible to remove from the cable hitherto used the limitation respecting dielectric strength (that is to say, if the insulation would not break down under great strain and be disrupted and destroyed), still the dielectric losses of the kind already mentioned as leakage would become so great as to forbid operation at voltages greatly exceeding the normal.

Over against the advantage stated must be set the expense (in most cases requisite) of maintaining the necessary pneumatic pressure. This is a disadvantage or inconvenience which is relatively greater in the case of short cable lengths than long; and it is relatively greater where the amounts of power carried are small than where they are large. Furthermore, if the pressure required be so great as to approximate say 100 pounds per square inch, the cable (this has been intimated already) and the terminals may have to be especially constructed, to withstand the pressure.

In the case of important cables, carrying large amounts of power over great distances, such special arrangements and construction of terminals as may be found requisite will be of little moment when compared with the cost and importance of the cable itself. Again, since the practice of our invention permits transmission under voltages fifty to one hundred per cent greater than when a cable of the hitherto prevalent type is employed, two cables of our invention can do the work of three or four of equal size of the former type. Such a saving, manifestly, warrants increase of cost of cable and of terminals too, through a very wide margin.

Still another instance, where the advantages of our improved cable outweigh the disadvantages, is found in case a single-conductor cable (and, to limited extent, the same is true of a three-conductor cable) of relatively short length connected to an open overhead line. Such a cable so connected may be of unusual importance, considering its length. In this case the advantages consequent on the use of our invention may easily justify the added expense. If the short cable is to be used at a station in which terminate other cables of our invention, the economy of the use of the invention in the short cable will be still more clearly apparent.

Where voltages are relatively low our invention will not, except under peculiar circumstances, be advantageous. Peculiar circumstances, such as we have just suggested, may, for instance, be found where temperatures are high and the possibilities for heat dissipation limited. But the principal field of usefulness of our invention is found with cables operating under loads of 20,000 volts and upwards. Without enlargement of dimensions, the voltage limit may, by the adoption of our invention, be increased from 20,000 to 35,000; from 25,000 to 40,000, or more. Or, if increase in voltage is not desired, thinner insulation may be used, with economy of space, or with advantageous enlargement of the conductor within. In either case, the cost per unit of transmitting power would be less.

The possibility of increasing the operating voltage beyond the limit permissible for a cable of the type hitherto employed opens an entirely new field; it now becomes possible to transmit electric energy by cable economically over much greater distances; for the distance economically possible is, within a wide range, proportionate to the voltage. For instance, where the distance is so great as to forbid the use of cables of types hitherto used, and to require instead the use of overhead transmission, it may now become good practice, by means of our invention, to resort instead to cable transmission. What has just been said has been said with multiple-conductor cables in mind; similar conditions obtain with respect to single-conductor cables, although the voltages permissible with single-conductor cables would be possibly fifty to one hundred per cent greater than with multiple-conductor cables. It is apparent, then, that a single-conductor cable embodying our present invention may be employed for carrying current under voltages heretofore possible for open-wire overhead transmission only. That is to say, in certain cases transmission by single-conductor cable of our invention is possible, where previously cable transmission has not heretofore been possible by any means.

Sight must not be lost of the fact that when a cable of the present invention is applied in place of a cable of precedent type, even without any change in dimensions, and without change in voltage of operation, still the advantage will be enjoyed of diminished dielectric loss.

In the case of single-conductor cables, designed for very high voltages, advantage will be found in the use of a hollow conductor; a conductor composed of a multiplicity of wires laid concentrically over the surface of a flexible conduit (made up ordinarily of sections of metal which interlock and which are very flexible, and which constitutes the core of the cable). The walls of such a central conduit are quite pervious to air, and, accordingly, by its very construction such a conduit affords opportunity for free pneumatic communication to the farthest extent of the installation. Inasmuch as the layer of wires which in this case constitutes the conductor is enclosed in an envelope of considerable thickness of wrapped-on paper insulation, and inasmuch as change in air pressure can become effective but slowly through such a layer of paper, it will be found that the maintenance of pressure in the hollow center of the cable will be effective, to prevent serious breakdown of the cable consequent on leakage through the outer cable sheath. In this case maximum pressure is maintained near the conductor, where it is most needed. This feature of the invention is illustrated in Fig. III of the drawings. The central flexible pervious conduit is indicated at 7. The conductor is indicated at 1, and is in this case made up of a plurality of strands of smaller wire. 2 is the wrapped-on insulation enveloping the conductor, and 6 is the cable sheath.

In the building of cables of the particular form last alluded to, as well as those of other forms, having dry paper insulation, it will be advantageous to fill the bar of the lead press with a very thick viscid compound, which being present will tend to seal the paper beneath against the escape of air, in case a perforation should occur of the lead sheath. The method of procedure here indicated will be understood on reference to Fig. VI of the drawings. There the cable is shown in process of being sheathed. The unsheathed cable 8 advances in the direction indicated by the arrow a, through the lead press, and emerges as the sheathed cable 9. The advance of the article under treatment is vertically downward. The lead press includes a "bar" 10, which is tubular, to allow the advance of the cable, and a cylinder 11 with a head 12 which, but for an opening for the passage of the cable, closes the press below. Within the cylinder and between walls 10 and 11 is a supply of lead L which, being put under hydraulic pressure (the well known means are not shown), is extruded through the suitably formed space b, between the adjacent edges of bar 10 and cylinder head 12. As in operation the lead is extruded, the cable body is caused to advance, and thus the advancing cable is sheathed.

Our procedure alluded to above may be achieved by causing the upper end of the "bar" 10 to flare and to form with the body of the cable a receptacle for a supply of viscid compound C. Normal operation of the lead press will then effect the end desired. A layer of plastic compound confined beneath the lead sheath by means of a wrapping of varnished cloth will have the same effect, to prevent escape of air under pressure, in case of perforation.

Fig. VII illustrates a cable structure in which are combined the various features severally illustrated in Figs. III, IV, and VI. Specifically, the cable of Fig. VII is a hollow cable in which the stranded conductor 1 is laid upon a central, flexible, pervious conduit 7. The annularly disposed conductor 1 is enveloped in insulation 2, and between the insulation and the lead sheath 6 is intercalated, in the manner already described, a layer of thick, viscid compound 18. Externally, the structure is strengthened against disruption under pressure by a wrapping 17 of such material as steel or bronze tape.

Wherever the fluid pressure maintained is communicable longitudinally through the cable, failure of pressure (a pressure gauge will ordinarily be employed) will be a telltale, an indication, of a breach in the lead sheath—due perhaps to mechanical injury, to chemical erosion, or to electrolysis. The possibility of automatically cutting out a length of cable which has been injured has been indicated. Again, in case of a perforation of the sheath, air or liquid of viscid material under pressure from within passing forcibly through the opening will prevent entrance of water, which otherwise entering would ruin the cable to the extent of its penetration.

With attention confined again to the air-filled cable, as distinguished from the cable in whose fluid or plastic insulation bubbles of air are entrapped, these further advantages are to be noted: An air-filled cable may be installed at any temperature, whereas a cable filled with viscid compound requires particular consideration on this account. In the case of the air-filled cable there will be no deterioration in service consequent upon migration of compound—a difficulty met with in some uses of compound-filled cables. Still another advantage of the air-filled cable is that wrinkles and other defects in manufacture which are apt to occur in the wrapped-on paper are not prejudicial, or at least not prejudicial in such degree, as when the insulation is filled with insulating compound.

In the case of a high voltage cable, economy demands that the cable be operated at the highest voltage which the dielectric will safely withstand; or, stated conversely, for a given working voltage the thinnest insulation which will safely withstand the stress will be applied to the conductor. With this controlling condition in mind, the value of our invention will be fully apparent.

In a divisional application filed May 17th, 1924, Serial No. 714,011, we are laying claim to that specific embodiment of the invention herein described which consists wholly or in part of a fluid in which bubbles of air are ineradicably present. In this application we make the following claims:

We claim as our invention:

1. In the maintenance of an electric transmission line adapted to carry current under a pressure of 10,000 volts as a minimum and including a conductor insulated within an air-containing envelope, the method herein described of preventing ionization of the contained air which consists in increasing pressure upon the contained air to an absolute pressure of two atmospheres as a minimum.

2. A high-tension cable including in its structure a conductor enveloped in superposed layers of insulation, the underlying layer being massive and the overlying layer being open and filled in its interstices with air under pressure, substantially as described.

3. A high-voltage cable in which the conductor is surrounded by an envelope of insulation of graded character, the portions of the envelope nearer the conductor being more massive, and the portions farther from the conductor being filled with air under pressure, substantially as described.

4. A high-tension cable including a conductor and a body of air-containing insulation surrounding said conductor, the air contained in said insulation being under a pressure as great as two atmospheres, and the said body of insulation being separated into sections longitudinally of the cable by partitions resistant to pressure transmission, subtantially as described.

5. A high-voltage cable including in its structure a hollow air-containing conductor pervious to pneumatic pressure, a surrounding envelope of wrapped-on, laminate, air-containing insulation, and a normally impervious sheath enveloping the insulated conductor and making surface contact thereupon throughout its entire superficial extent, the air within the hollow conductor being maintained under pneumatic pressure, substantially as described.

6. A high-tension electric transmission installation including a cable comprising a conductor, an envelope of air-filled insulation surrounding the conductor, a lead sheath enveloping the insulated conductor, with a layer of plastic compound between air-filled insulation and lead sheath, the air within the insulation being subject to pressure in excess of atmospheric, substantially as described.

7. A high-tension cable includng a conductor, a body of air-containing insulation surrounding said conductor, and a lead sheath, the air within the body of insulation being under pressure in excess of atmospheric, and said sheath being surrounded and reenforced by a casing having greater resistance to expansive force from within.

In testimony whereof we have hereunto set our hands.

HENRY W. FISHER.
RALPH W. ATKINSON.

Witnesses:
  TRACY D. WARING,
  GEORGE J. SHURTS.